G. C. Taft,

Twine Cutter.

No. 4,003. Reissued May. 31. 1870.

Witnesses;
Geo. C. Taft Jr.
[illegible]

Inventor;
Geo. C. Taft

N. PETERS, PHOTO-LITHOGRAPHER, WASHINGTON, D. C.

United States Patent Office.

THOMAS B. DOOLITTLE, OF BRIDGEPORT, CONNECTICUT, ASSIGNEE OF GEORGE C. TAFT.

*Letters Patent No.* 99,494, *dated February* 1, 1870; *antedated January* 25, 1870; *reissue No.* 4,003, *dated May* 31, 1870.

IMPROVEMENT IN TWINE-CUTTER.

The Schedule referred to in these Letters Patent and making part of the same.

*To all whom it may concern:*

Be it known that GEORGE C. TAFT, of Worcester, in the county of Worcester and State of Massachusetts, did invent certain new and useful Improvements in Twine-Cutters, of which the following is a full, clear, and exact description, reference being had to the accompanying drawing forming part of this specification, and in which—

Figure 1:
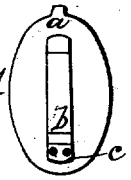
Figure 1 represents a face or front view of the improved twine-cutter.

In the several figures the same part is designated by the same letter of reference.

Previous to the invention made the subject of this application, many different devices have been suggested and employed to serve the purposes of twine and thread-cutters, among which are familiarly known the different knife-fixtures applied to store-counters, and to stores, &c.; and to these ends, The invention consists in an implement or article having some suitable cutting device, and adapted to be hooked or pinned onto the clothing, as will be hereinafter more fully described.

In the drawing—

Figure 2:
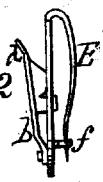
Figure 2 is a vertical side or edge view of the same.
Figure 3:
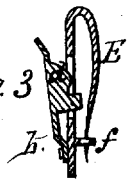
Figure 3 is a longitudinal section.

*a* represents a shield or body formed of sheet metal, of any desirable shape and size, and with a hook or pin, E, which is adapted to be stuck into a person's garment, and which catches into a retaining-hook, *f*, after the fashion of ladies' breast-pin, (see figs. 2 and 3.)

Figure 4:
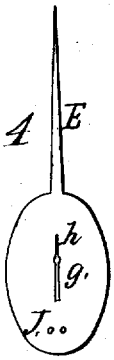
Figure 4 is a plan view of the body or shield before having its hook or pin cut into shape.

This pin E may be either formed out of the same stock as in the body *a*, *g*, and bent around, as seen at figs. 3 and 4, or it may, if deemed expedient, be made separately, and attached to said body portion.

*b* is a spring bar, which is secured at its root or lower end to the body or shield by screws passing into holes at I; and said spring bar is provided with a knife or cutter, *d*.

This knife *d* may be either secured to the spring bar *b* or formed on it, and is peculiarly shaped, as seen in the drawing, so as to present a double cutting-edge, or, in other words, a succession of two cutting-edges, arranged at an angle with each other in such a manner that, should the first fail to wholly sever the cord or twine, the second will consummate the cutting off.

The body or shield is made with a cut or slot through it, as seen at *h*, to permit the protrusion through it of a part of the cutter or knife *d*, as clearly shown at figs. 2 and 3.

By thus having the cutting device *d* extend into the slot or cut *h*, it will be seen that the operator or person using the instrument, (for instance, pinned onto the coat or vest,) can conveniently bring the cord to be cut down between the cutter and the face of the shield, and that the cord passing down across the face of the shield will force the cutter outward as it rides over the first cutting-edge, while the spring bar will force the cutter in again as the cord rides over the second cutting-edge, if not severed by the first.

By this construction and arrangement together of the yielding-knife and the shield, a sort of shearing cut is insured, and the severance of the cord by one or both cutting-edges is made certain. But I do not wish to have it understood that the invention is limited to the combination and arrangement of parts shown and described, this being only a secondary feature of the invention, the important idea of which is in the making of a cutting device or apparatus in such a manner that it can be readily pinned or hooked on to a person's clothing, and, when so attached, perform successfully the functions of a cord or thread-cutter.

It will be seen that the improved universal twine and thread-cutter can be made small and neat in appearance, of various designs or patterns, and can be worn conveniently on the vest or coat-collar of male, and on the dress of female store-attendants, who can use it with great advantage.

Having fully explained the improved twine and thread-cutter so that it can be readily understood,

What is claimed as new, and desired to be secured by Letters Patent, is—

1. A twine or thread-cutter, composed of a suitable cutting device, in combination with a pin or hook for the attachment of the instrument or article, substantially as set forth.

2. A yielding knife-edge or cutter, in combination with the plate or shield and pin or hook-fastening, as and for the purposes described.

3. The cutting device *d*, having a series of cutting-edges, and operating substantially in the manner hereinbefore described, for the purpose set forth.

4. A shield or plate, having a fastening-hook or pin formed of one piece of sheet metal and bent into shape, as shown and described.

In testimony whereof I have hereunto set my hand and seal this 7th day of April, 1870.

T. B. DOOLITTLE. [L. S.]

Witnesses:

J. F. FAYEMEATHER,

A. S. MAY.